Aug. 17, 1926.

F. H. BELLOWS

SOCKET WRENCH

Filed July 30, 1923

1,596,708

Franklin H Bellows
Inventor

By his Attorneys
Moses, Hammond & Walter

Patented Aug. 17, 1926.

1,596,708

UNITED STATES PATENT OFFICE.

FRANKLIN HUBBARD BELLOWS, OF WORCESTER, MASSACHUSETTS, ASSIGNOR TO WALDEN-WORCESTER, INCORPORATED, OF WORCESTER, MASSACHUSETTS, A CORPORATION OF MASSACHUSETTS.

SOCKET WRENCH.

Application filed July 30, 1923. Serial No. 654,533.

This invention relates to wrenches of the socket variety and has special reference to the type in which the socket is detachable from the shank or rod upon which it is normally carried to permit other sockets to be used on the same rod.

It is one of the objects of this invention to provide means for removably securing the socket upon the shank or rod so as to overcome the tendency of the socket to work loose when in service.

Another object of the invention is to provide a means for securing the socket upon the shank, which will have the desired properties above outlined and will be no more expensive to construct than the means heretofore used.

It has been customary heretofore in removably securing the socket of a wrench upon the shank, to form a small countersunk depression in the slabbed end of the shank and to provide the socket with a tapped hole, at right angles to the slabbed portion of the shank through which a set screw is inserted to project into the depression in the shank and hold the socket in place thereon. It has been found, however, that in this construction the screw has a tendency to loosen up and permit the socket to drop off, especially when used upon motor driven shafts as in the assembly plants of automobile factories.

It is a feature of my invention that the hole in the socket carrying the set screw is drilled at an angle to the slabbed end of the rod or shank whereby the end of the screw exerts both a longitudinal and lateral pressure upon the walls of the depression in the rod which tends to lock the screw in place and hold the socket more securely upon the rod.

Other objects and advantages will appear as the description proceeds.

Referring to the accompanying drawings, which illustrate a preferred embodiment of the invention, Fig. 1 is a sectional view on the line 1—1 of Fig. 2, through the socket and shank.

Figure 1:
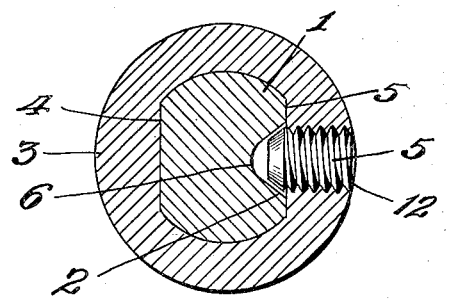

In the embodiment illustrated the shank or rod 1 is provided with slabbed sides 2, upon which the socket 3 fits, the socket being provided with flat sides 4 to correspond to the slabs 2 of the shank.

Figure 2:
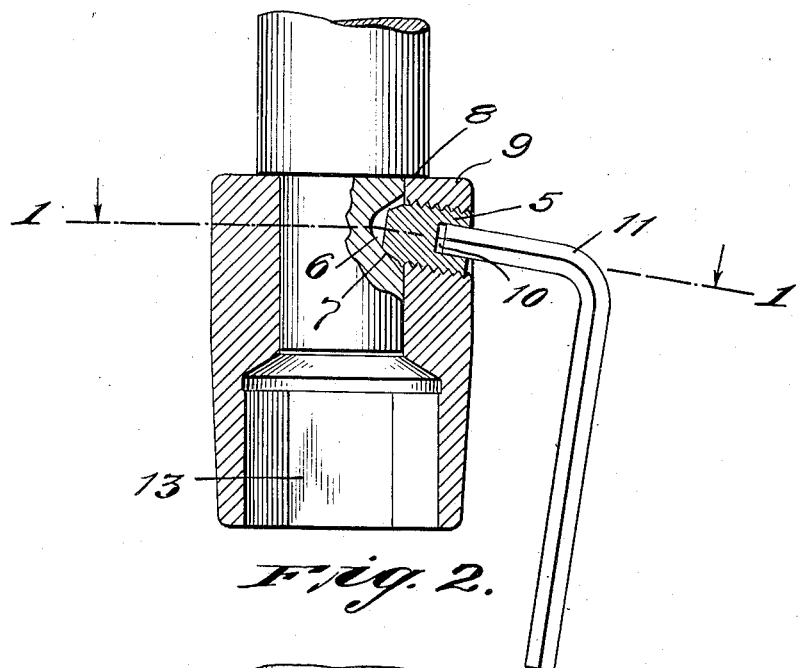
Fig. 2 is a part sectional view through the socket and shaft, taken longitudinally of the shaft.
Figure 3:
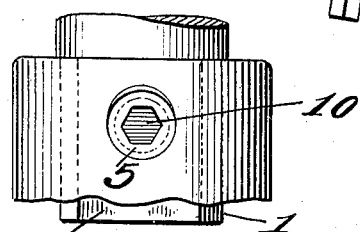
Fig. 3 is a plan view showing how the set screw is inserted into the tapped hole in the socket.

A set screw 5 projects through the socket and into the depression 6 in the flat side 2, to hold the socket in place upon the shank. Instead of being normal to the plane of the side 2, the set screw 5 projects through the socket at an angle of approximately 15°, as illustrated in Figs. 2 and 3. As illustrated in Fig. 2, the depression 6 is not in line with the hole 9 in the socket but is so spaced relative to the collar 8 that the end 7 of the screw 5 strikes the inclined wall of the depression. By this means, instead of bearing squarely upon the bottom of the depression 6, the point on the screw nearest the end of the shank bears against the inclined wall of the depression with a wedging action and tends to slide the socket upwardly on the shank against the collar 8. This puts the screw under a torsional or side-wise strain in the tapped hole 9, which tends to lock the screw against movement when it is screwed down and prevents the socket from working loose from the shank.

For manipulating the screw 5 it is provided with a socket 10 in its upper end, into which the correspondingly shaped shank or wrench 11 fits. When the screw 5 is screwed down the wrench is removed and the top of the screw is below the surface of the socket as illustrated at 12, so there are no projecting portions to catch the clothing or hands of the operator.

The portion 13 of the socket, which fits over the nut may be of any desired shape or size to correspond to the various shapes and sizes of nuts.

It will be seen that by the arrangement described, I have provided a means for positively locking the set screw in place and thereby locking the socket upon the shank, without increasing the cost of the wrench, it being merely necessary to drill the hole 9 at an angle to the slabbed side of the shank to effect this desirable change.

Various modifications can be made without departing from the spirit of the invention or the scope of the appended claims.

What I claim is:

1. A tool comprising a shank, a removable work-engaging member thereon and adjustable means projecting through said work-engaging member and bearing against the side of said shank in a direction forming an oblique angle with both the axis of said shank and the axis of said means to releasably lock the work-engaging member upon the shank.

2. A wrench comprising a shank, a removable socket thereon, a tapped hole extending at an angle through the wall of the socket, a set screw extending through said hole and bearing at an oblique angle to both the axis of said shank and said screw on the side of said shank to lock the screw in said tapped hole.

3. A socket wrench comprising a shank and a correspondingly shaped wrench socket removably fitted thereon, a depression in the side of the shank, an oblique hole through the socket and a screw projecting through the hole, one side of said screw bearing against the inclined wall of the depression to cause a jamming of the screw in the oblique hole to prevent loosening of the screw in service.

4. A wrench comprising a flat-sided shank, a removable socket thereon, a depression on the flat side of said shank, an oblique tapped hole through said socket, and a screw projecting into said depression and engaging said depression on one side thereof in a direction at an oblique angle to both the axis of said shank and said screw to lock the socket upon the shank.

In testimony whereof I have affixed my signature to this specification.

F. HUBBARD BELLOWS.